US011564779B2

(12) United States Patent
Spindler

(10) Patent No.: US 11,564,779 B2
(45) Date of Patent: Jan. 31, 2023

(54) SUPERSTRUCTURE SUPPORT HAVING SPECIAL IMPLANT POST GEOMETRY

(71) Applicant: Bruno Spindler, Oppenau (DE)

(72) Inventor: Bruno Spindler, Oppenau (DE)

( * ) Notice: Subject to any disclaimer, the term of this patent is extended or adjusted under 35 U.S.C. 154(b) by 652 days.

(21) Appl. No.: 16/319,326

(22) PCT Filed: Jul. 18, 2017

(86) PCT No.: PCT/DE2017/000212
§ 371 (c)(1),
(2) Date: Jun. 23, 2019

(87) PCT Pub. No.: WO2018/014897
PCT Pub. Date: Jan. 25, 2018

(65) Prior Publication Data
US 2019/0298498 A1 Oct. 3, 2019

(30) Foreign Application Priority Data
Jul. 20, 2016 (DE) ...................... 10 2016 008 669.6

(51) Int. Cl.
*A61C 8/00* (2006.01)
(52) U.S. Cl.
CPC ............ *A61C 8/0059* (2013.01); *A61C 8/006* (2013.01); *A61C 8/0068* (2013.01); *A61C 8/0069* (2013.01)
(58) Field of Classification Search
CPC ..... A61C 8/0022; A61C 8/0048; A61C 8/005; A61C 8/0051; A61C 8/0053;
(Continued)

(56) References Cited

U.S. PATENT DOCUMENTS 5,069,622 A * 12/1991 Rangert ............... A61C 8/0068
433/173
5,169,309 A * 12/1992 Staubli ................. A61C 8/005
433/173

(Continued)

FOREIGN PATENT DOCUMENTS

DE 9417182 U1 2/1995
DE 202012102746 U1 8/2012
(Continued)

*Primary Examiner* — Ralph A Lewis
(74) *Attorney, Agent, or Firm* — Smartpat PLC

(57) ABSTRACT

The invention relates to a superstructure support (20) as part of a prosthetic tooth replacement (1) between an implant body (10) and a superstructure, comprising a hollow implant post (23, 150, 160, 170, 180, 190), a hollow implant pin (50), and an implant flange (31) lying therebetween. The cavity zones (67, 62) of the implant post (23, 150, 160, 170, 180, 190) and of the implant pin (50) transition into each other. The center lines (69, 63) include an angle of 60 to 86 angular degrees. An attachment element (5) can be arranged on the implant post (23, 150, 160, 170, 180, 190) in a rotationally fixed manner by means of an assembly joint (140), which forms an interface (141, 145). The attachment element (5) is a cap-type element. At least some areas of the implant flange (31) have a supporting enveloping surface (37). The attachment element (5) has an interface geometry (146), which can be mounted on the interface geometry (142) of the superstructure support (20) in an interlocking and/or frictional manner at least in some areas. By means of the invention, a superstructure support (20) for the prosthetic tooth replacement is improved in such a way that the interface between the implant post (23, 150, 160, 170, 180, 190) and the attachment element (5) enables secure and simple joining and disconnecting of the interface components.

14 Claims, 8 Drawing Sheets

(58) Field of Classification Search
CPC ... A61C 8/0054; A61C 8/0056; A61C 8/0059; A61C 8/006; A61C 8/0066; A61C 8/0068; A61C 8/0069; A61C 8/0072; A61C 13/10; A61C 13/1006; A61C 13/1009; A61C 13/102
See application file for complete search history.

(56) References Cited

U.S. PATENT DOCUMENTS

| | | | | |
|---|---|---|---|---|
| 5,195,891 | A * | 3/1993 | Sulc | A61C 8/005 433/173 |
| 5,571,015 | A * | 11/1996 | Siegmund | A61C 8/005 433/173 |
| 5,662,475 | A * | 9/1997 | Mena | A61C 8/005 433/172 |
| 6,672,871 | B2 * | 1/2004 | Hurson | A61C 5/70 433/172 |
| 10,188,487 | B2 * | 1/2019 | Spindler | A61C 8/005 433/173 |
| 2002/0031749 | A1 | 3/2002 | Morgan | |
| 2007/0037122 | A1 * | 2/2007 | Bassett | A61C 8/0077 433/173 |
| 2009/0117520 | A1 * | 5/2009 | Kikuchi | A61C 8/005 433/174 |
| 2009/0298013 | A1 * | 12/2009 | Baruc | A61C 8/0065 433/174 |
| 2011/0014588 | A1 * | 1/2011 | Seavey | A61C 8/0059 433/174 |
| 2011/0183290 | A1 | 7/2011 | Galgut et al. | |
| 2012/0308960 | A1 * | 12/2012 | Mash | A61C 8/005 433/173 |
| 2012/0322030 | A1 * | 12/2012 | Fromovich | A61C 8/0089 433/173 |
| 2013/0143178 | A1 | 6/2013 | Ophuysen | |
| 2015/0272709 | A1 * | 10/2015 | Kim | A61C 8/0048 433/169 |
| 2015/0335401 | A1 | 11/2015 | Robichaud et al. | |
| 2016/0206408 | A1 | 7/2016 | Spindler et al. | |
| 2017/0239019 | A1 * | 8/2017 | Kasem | A61C 8/0068 |
| 2019/0298498 | A1 * | 10/2019 | Spindler | A61C 8/005 433/173 |
| 2020/0093578 | A1 | 3/2020 | Spindler | |

FOREIGN PATENT DOCUMENTS

| | | |
|---|---|---|
| DE | 102013013565 A1 | 1/2015 |
| EP | 2644152 A1 | 10/2013 |
| WO | 9842273 A1 | 10/1998 |
| WO | 2014012973 A2 | 1/2014 |

* cited by examiner

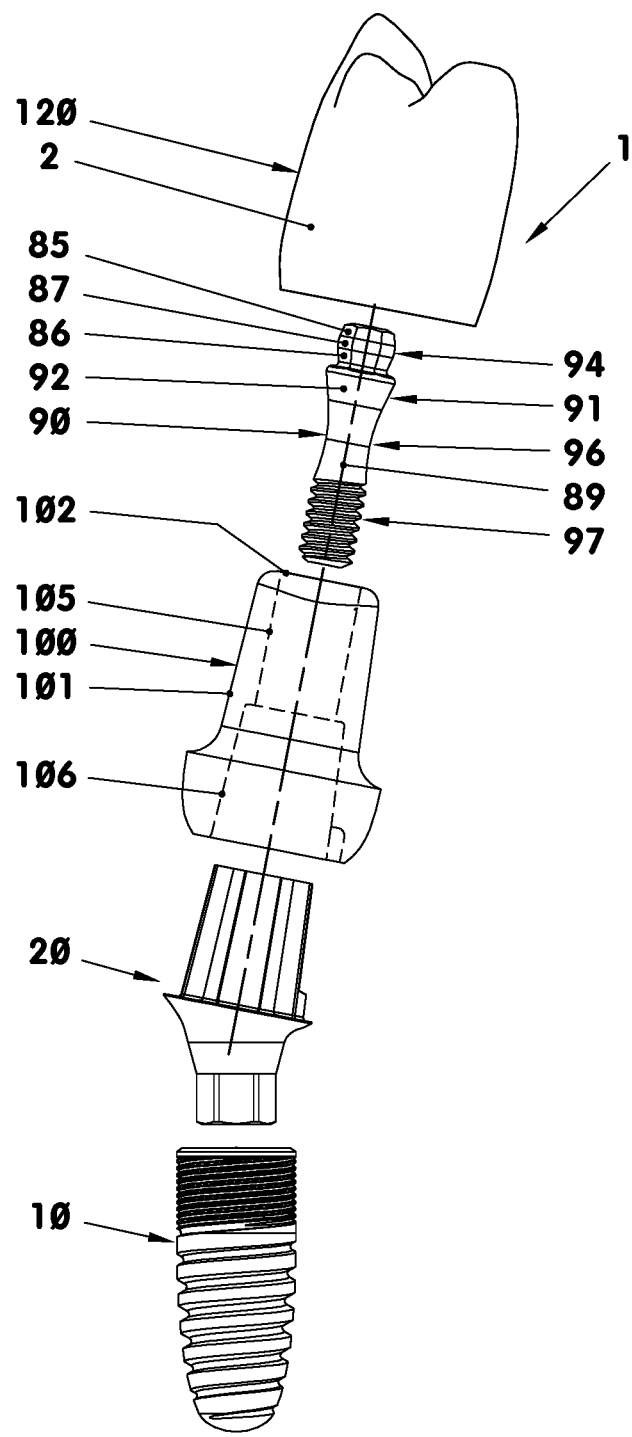
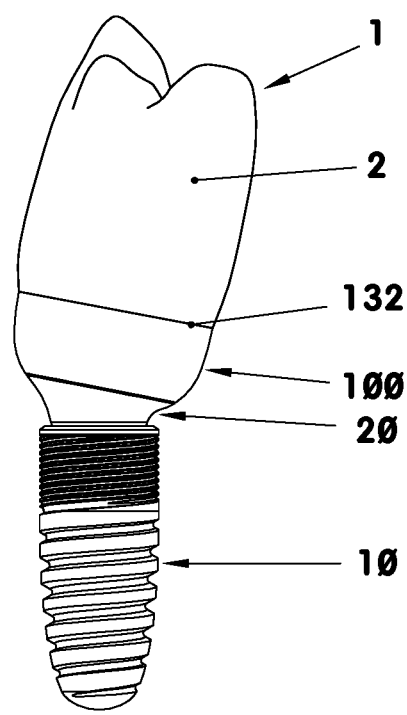
Fig. 1
Fig. 2

Fig. 12
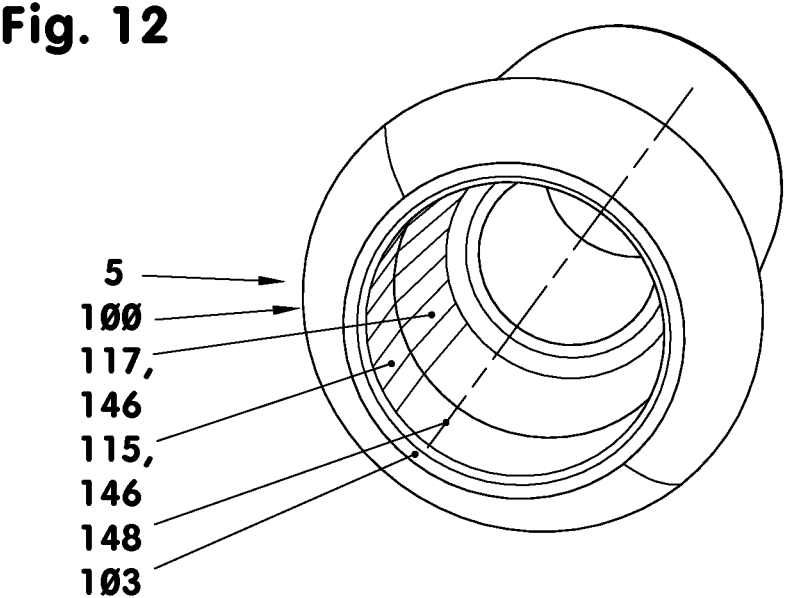
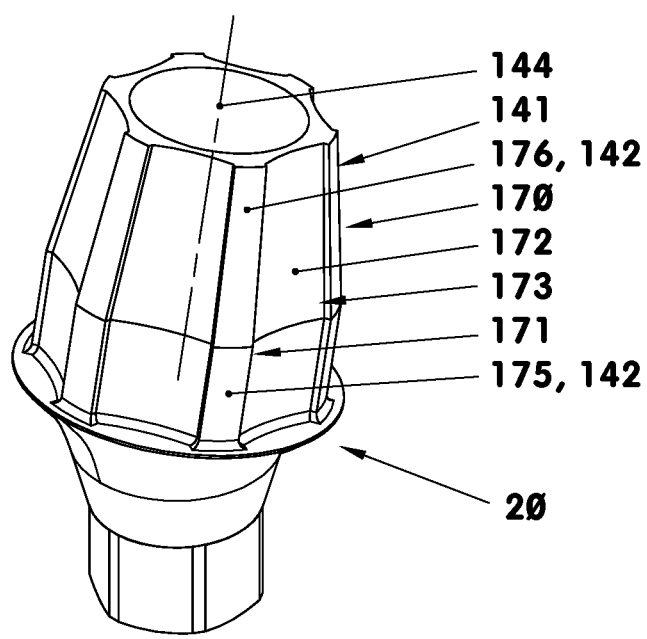
Fig. 11

Fig. 16
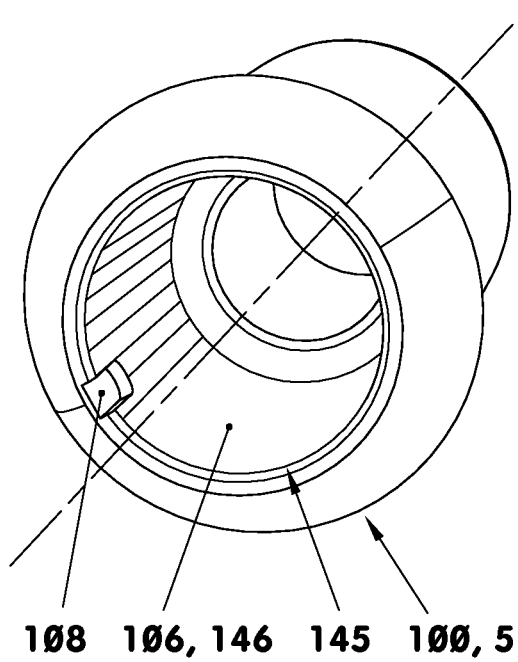
108 106,146 145 100,5
Fig. 18
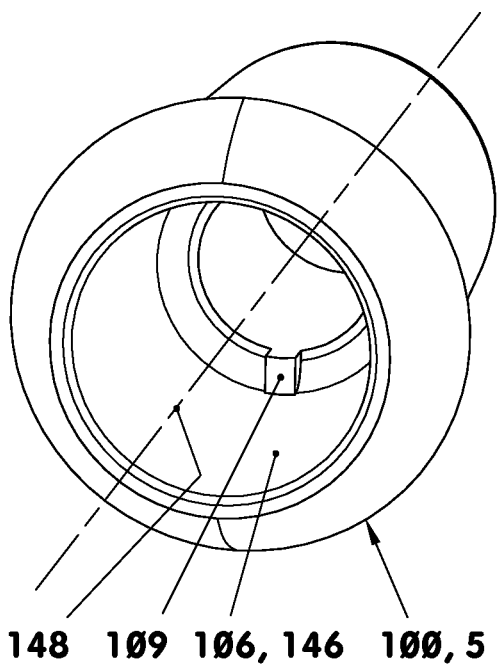
148 109 106,146 100,5
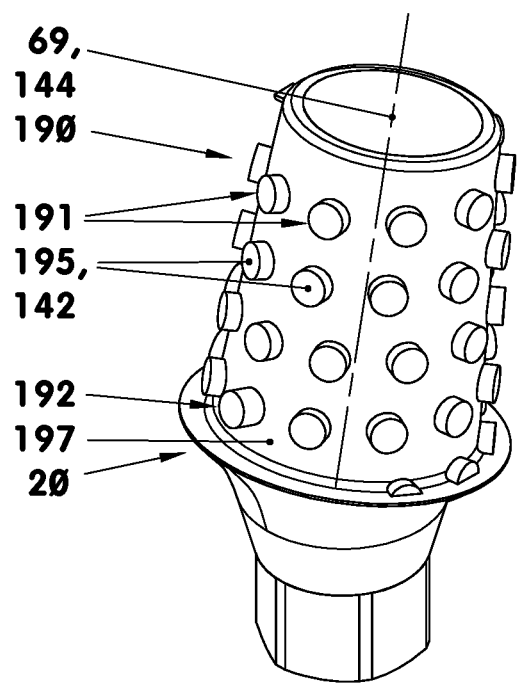
69, 144
190
191
195, 142
192
197
20
Fig. 15
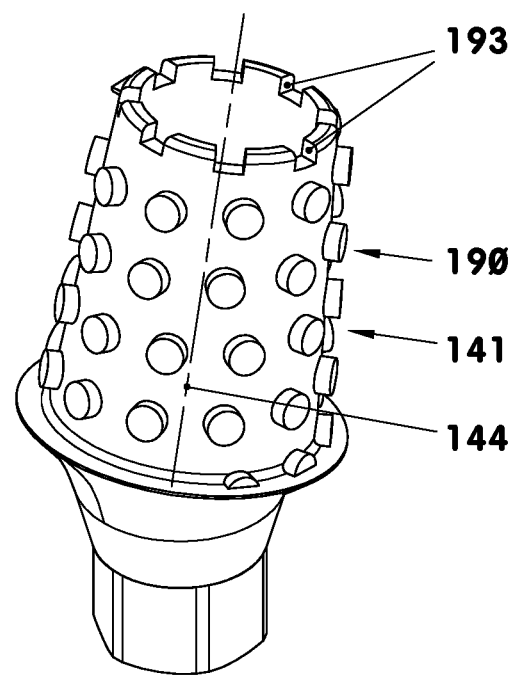
193
190
141
144
Fig. 17

SUPERSTRUCTURE SUPPORT HAVING SPECIAL IMPLANT POST GEOMETRY

TECHNICAL FIELD

The invention relates to a superstructure support as part of a prosthetic tooth replacement between an implant body and a superstructure, comprising a hollow implant post, a hollow implant pin, and an implant flange arranged therebetween.

BACKGROUND

In dental implantology, an endosseous implant body that carries the prosthesis is often used, for example, in the fabrication of a single prosthetic tooth replacement. In such a case, the implant body, a type of screw plug, is screwed into an artificially created hole in the patient's jaw. The screwed-in implant body receives a superstructure support for the completed prosthesis. The latter may be screwed into the implant body with a special screw in a rotationally fixed manner. A superstructure forming the visible tooth crown is placed directly or indirectly on the superstructure support, for example by bonding.

A tooth implant mounting system is known from DE 20 2012 102 746 U1, with which an implant body, a superstructure support, an adhesive body and an artificial crown form an artificial tooth replacement.

The present invention is based on the problem of improving a superstructure support in such a manner that the interface between the implant post and the respective attachment element enables a secure and simple joining and separating of the interface components.

SUMMARY

This problem is solved by a superstructure support forming part of a prosthetic tooth replacement between an implant body and a superstructure. The superstructure support includes a hollow implant post, a hollow implant pin, and an implant flange arranged between the hollow implant post and the hollow implant pin. Cavity zones of the implant post and of the implant pin transition into each other. Their centerlines include an angle of 160 to 186 angular degrees. An attachment element can be arranged on the implant post in a rotationally fixed manner by an assembly joint, which forms an interface. The attachment element is an artificial tooth crown, a composite of an adhesive body and a crown or another cap-type element. At least some areas of the implant flange have a support enveloping surface. The attachment element has an interface geometry, which can be mounted on the interface geometry of the superstructure support in an interlocking and/or frictional manner at least in some areas. The interface geometries have an outer and/or an inner enveloping surface, excluding the geometry area or areas that guarantee rotational fixing.

The superstructure support is arranged between an implant body and a superstructure, wherein the superstructure support has an implant post in an area supporting the adhesive body and/or tooth crown and at least one implant neck in the area facing towards the gum and the implant body. The superstructure support is fabricated from a blank, which is produced, for example, by means of a powder injection molding process. Titanium alloy Ti6Al4V may be used as the metal powder. In the area supporting the adhesive body and/or tooth crown, the injection mold gives the blank a shape mathematically similar to the finished shape. In the area turned towards the gum and the implant body, the injection mold gives the blank the shape of a raw pin. The raw pin obtains its finished shape through mechanical and/or optical separation machining.

The superstructure support has an implant post whose outer shape corresponds, for example, to a straight truncated cone. The implant post is based on the implant flange of the superstructure support from which it protrudes perpendicularly. The outer edge of the implant flange, for example, has a circular shape, with its center oriented in a manner concentric to the centerline of the implant post. In this manner, an adhesive body and/or a tooth crown can be permanently placed on the individual implant post as an attachment element, which is made, for example, of a rotationally symmetrical blank.

The implant post and the attachment element have a common interface. The attachment element can also be a cap-type element that can be used only temporarily during prosthesis fabrication and fitting. Here, the outer geometrical shape of the implant post meets the inner geometrical shape of the attachment element. This interface also includes the surface areas of the implant flange facing the implant post.

The geometrical shapes of the interface are designed in such a manner that the attachment elements, during prosthesis planning, fabrication and adjustment, can be repeatedly and accurately placed on and removed from the superstructure support, without any problems and without tilting or the application of major force. If, for example, the attachment element has to be glued or cemented to the implant post, there are cavities or gaps between the enveloping surfaces of the respective opposing geometrical shapes. Such cavities or gaps extend either in the direction of the implant post and/or in the direction of the respective attachment element. They also expand primarily transversely to the attachment direction of the respective attachment element.

Several elevations in the form of studs, bars, cones, noses, nubs or the like protrude from the implant post and/or the attachment element in order to, among other things, create cavities or gaps. If, for example, a plurality of identical hemispheres are integrally formed on a conical implant post (on the surface of which designated as the base surface), the outermost points of the spherical curvature of the hemispheres form an enveloping surface, which represents a truncated cone shell. During the assembly of the prosthesis, the intermediate space between the base surface and the enveloping surface provides the filling space for the adhesive or cement of the curable frictionally locking connection between the interface parts, namely the implant post and the attachment element.

BRIEF DESCRIPTION OF THE DRAWINGS

FIG. 1: Exploded view of a prosthetic tooth replacement.
FIG. 2: Side view of the prosthetic tooth replacement.

FIG. 11: Superstructure support shown in perspective with a cylindrical and conical enveloping surface.

FIG. 12: Adhesive body shown in perspective for the superstructure support according to FIG. 11.

FIG. 15: Superstructure support shown in perspective with a pin-studded implant post and a pin-like anti-twist device.

FIG. 16: Adhesive body shown in perspective for the superstructure support according to FIG. 15.

FIG. 17: Superstructure support shown in perspective with a pin-studded implant post and anti-twist grooves.

FIG. 18: Adhesive body shown in perspective for the superstructure support according to FIG. 17.

DETAILED DESCRIPTION

Figure 3:
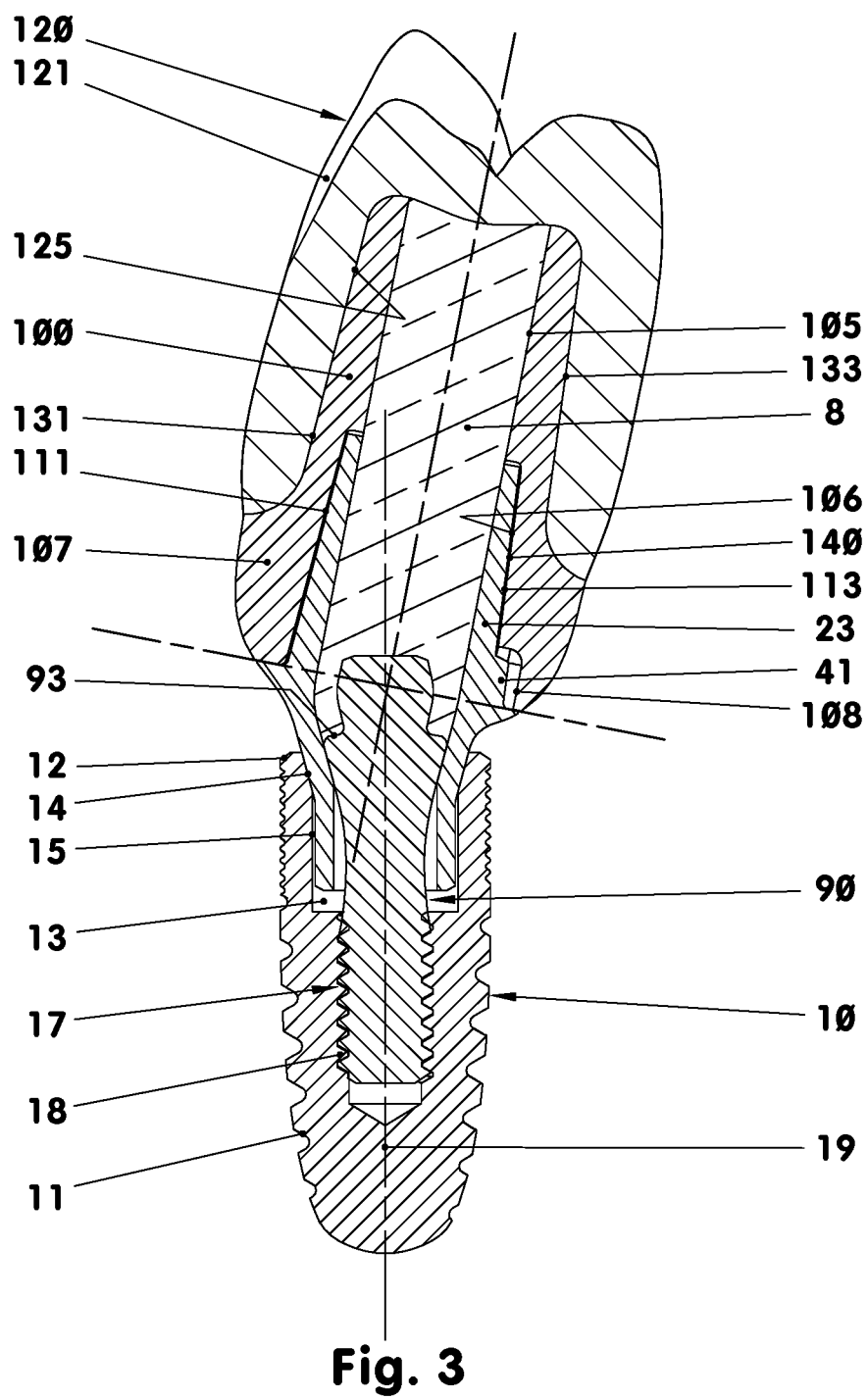
FIG. 3: Longitudinal section through a prosthetic tooth replacement, enlarged.

FIG. 1 shows an example of all parts of an artificial tooth (1) in the form of an exploded view. A hollow screw-type implant body (10) serves as the base. A superstructure support (20) is screwed to the implant body (10) in a rotationally fixed manner by a special hexagon head screw (90). An attachment element (5) is then adapted to the implant post (23) at the end of the superstructure support (20) that is free at that point. The attachment element (5) can be a temporary measuring and/or impression material or a finished tooth crown (120). Accordingly, an interface (141, 145) is located between the implant post (23) and the attachment element (5), the positive interface part (141) of which interface can receive various negative interface parts (145) one after the other chronologically.

The implant body (10) is, according to FIGS. 1 to 3, a hollow screw with a possibly self-tapping (for example, non-metric) external thread (11). For example, with a diameter of 3.53 mm, it has a length of 8.42 mm. The implant body (10) has a multi-stage recess (13), which is divided into three zones as shown in FIG. 3. The first zone (14)—located in the area of the implant shoulder (12) of the implant body (10)—is, for example, an inner cone (14), which, for example, with a height of 0.65 mm, has a cone angle of, for example, 30 angular degrees, see FIG. 3. The inner cone (14)—as part of the second zone (15)—changes into a design serving as an anti-twist device, for example in the form of an inner hexagon socket. The inner hexagon socket (15) measures, for example with a height of 2.89 mm, a key length of 2.1 mm. The inner hexagon socket (15), which can also be, for example, a double inner hexagon socket or another interlocking and/or frictionally locking anti-twist geometry, may be followed—not shown here—by a cylinder seat supporting the centering of the superstructure support (20) in the implant body (10). For example, the short cylinder seat then has a diameter that corresponds to the key length of the inner hexagon socket (15).

The third zone (17) is a threaded hole that receives the hexagon head screw (90) holding the superstructure support (20) during assembly. Behind the end of the, for example, 2.9 mm-long M 1.6 internal thread (18), there is, for example, a short cylindrical thread outlet.

The superstructure support (20), which is e.g. 7.67 mm long, has the primary task—sitting in the implant body (10)—of serving as the base for the artificial tooth crown (120). It has an area (51) facing the implant body (10) and an area (21) that receives the tooth crown (120) or the superstructure, as the case may be, see FIGS. 4 and 5.

The area (51) facing the implant body (10) is the hollow implant pin (50). This consists of an implant neck (52) that is, for example, 1.04 mm long on average, with an outer cone (53) that is, for example, 0.94 mm long, an outer hexagon (54) that is, for example, 1.5 mm long, of the key length of 2.1 mm, and a short cylinder projection, if present. The latter is not shown here.

The outer cone (53) and the outer hexagon (54) fit exactly in the recess (13) of the implant body (10). In the axial direction pointing towards the tip of the implant body (10), the end surfaces of the outer hexagon (54) and the short cylinder projection (if present) do not contact the recess (13).

Above the implant cone (53), for example, a plate-like implant flange (31) is connected; this, for example, emerges from the implant neck (52) with a continuous transition, see FIGS. 4 to 7. The lower side (32) of the implant flange (31) that is, for example, round, has, at least in some areas, the shape of the shell of a truncated cone, the cone angle of which opens towards the tooth crown (120). The cone angle is, for example, between 90 and 135 angular degrees. If necessary, the lower side of the implant flange (31) also consists of a multitude of partially uneven tapered cones that emerge from each other, whereas each of these includes a different angle with respect to the centerline (29). The transitions between the tapered cones may be rounded. Instead of part of the tapered cones of the implant neck (52), free-form surfaces can also be used.

The outer edge (33) of the implant flange (31) has a distance to the centerline (29) that may be variable. In the illustrated example, it is constant. It amounts to, for example, 2.23 mm. Thereby, the edge (33) is the outer boundary of the reference plane (38) or the end surfaces (77) according to FIGS. 6 and 7. Thereby, the outer edge (33) does not experience any height offset in the longitudinal direction of the centerline (29). With other embodiments, however, it is conceivable at least in some areas. It can then reach, for example, up to 2 mm.

Above the implant flange (31), the area (21) of the superstructure support (20) extends in the form of an implant post (23) as a positive interface part (141). The hollow implant post (23), which is e.g. 4.03 mm high, has the shape of a hexagonal straight truncated pyramid. The truncated pyramid here has six long pyramid edges, in the area of which the studs (26) are arranged. The outer surfaces (27), which are oriented in a manner radially outward, of the studs (26) are partial surfaces of a conceived enveloping surface (28) in the form of, for example, a straight truncated cone shell. Thereby, the outer surfaces (27) can lie on, below or above the theoretical pyramid edges. The overhang or recess can amount to up to 0.2 mm. The taper angle of the enveloping surface (28) usually measures 5 to 12 angular degrees. Here, the taper angle amounts to, for example, 7.36 angular degrees. The truncated cone shell-shaped enveloping surface (28) tapers with increasing distance from the implant flange (31). This enveloping surface (28) here is the interface geometry (142) of the assembly joint (140) located between the implant post (23) and the adhesive body (100), which represents the interface (141, 145).

Figure 4:
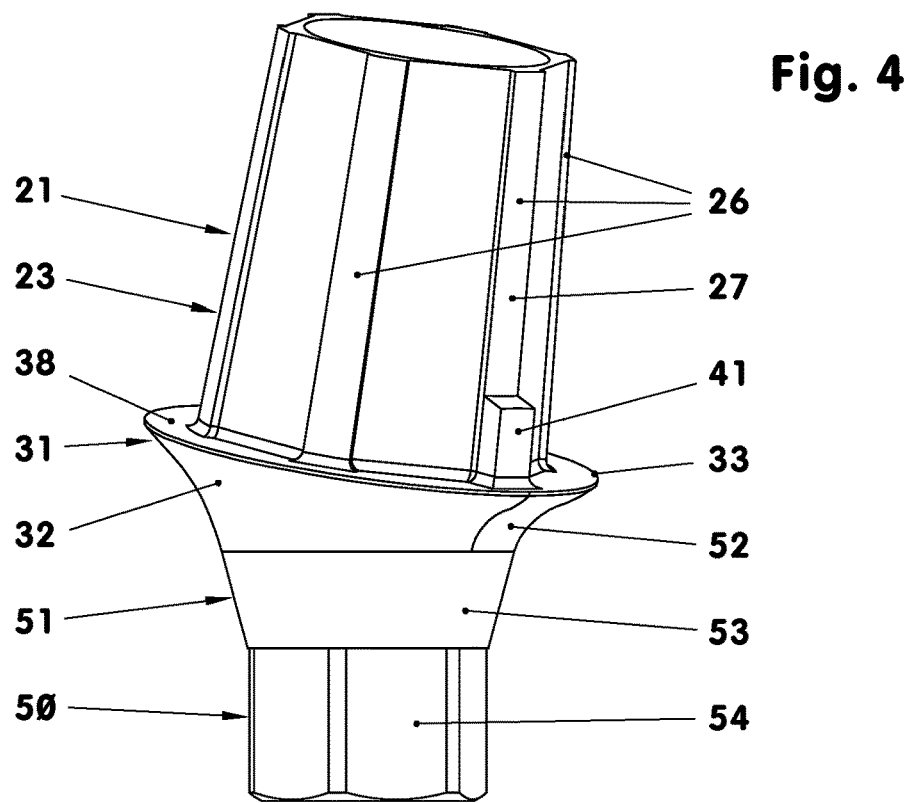
FIG. 4: Superstructure support, perspective.
Figure 5:
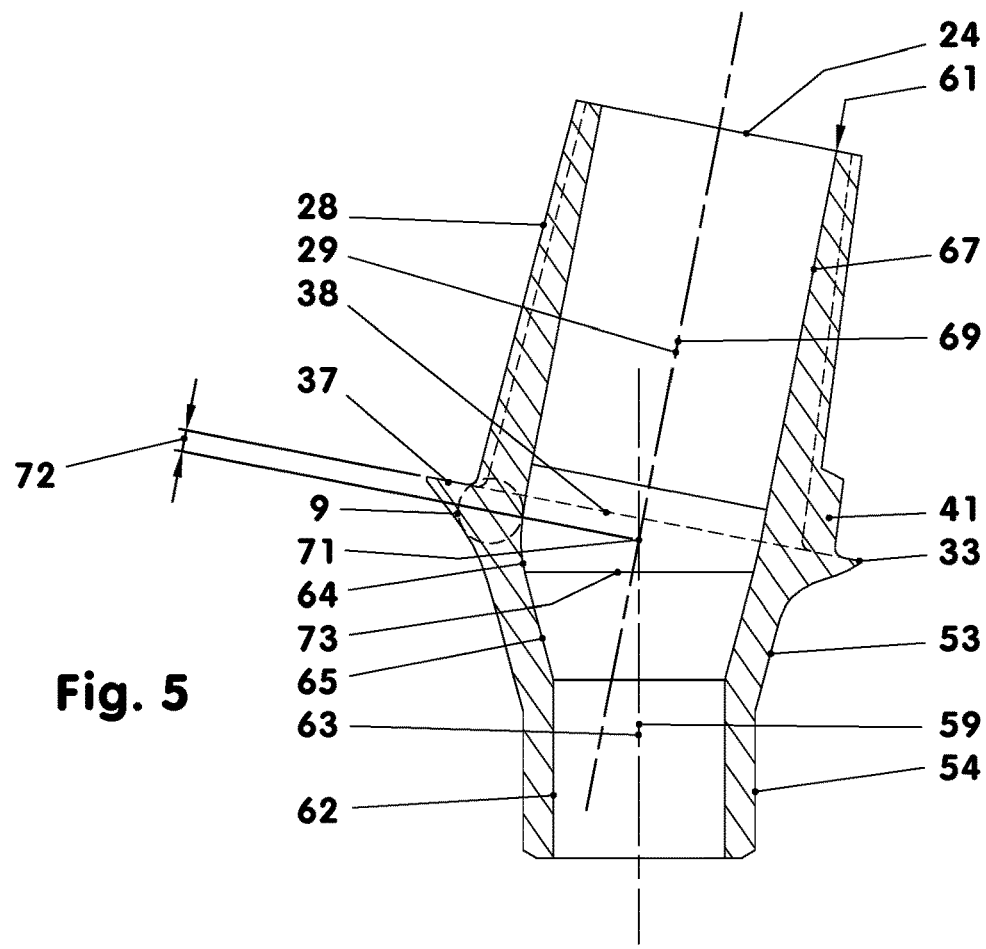
FIG. 5: Superstructure support in longitudinal section with a flat support enveloping surface.

In FIGS. 4 and 5, the implant post (23) has, for example, near the implant flange (31) on one of the studs (26), an anti-twist bar (41) that is, for example, 0.85 mm long, which protrudes 0.25 mm beyond the conceived truncated cone shell-shaped enveloping surface (28). The anti-twist bar (41) is not part of the interface geometry (142). The average width of the anti-twist bar (41) amounts to, for example, 0.58 mm. This special shape of the implant post (23) gives rise to an anti-twist base for the adhesive body (100) to be carried or the tooth crown (120) to be supported directly, as the case may be.

The implant post (23) ends at the top with an upper side (24), which may also serve as a bearing surface. The latter, see FIG. 5, is normally aligned with the centerline (29).

The implant post (23) has, for example, a rounded transition area (34) towards the implant flange (31). Around the transition area (34), the implant flange (31) has a flange upper side (37) forming a plane (38), as shown in FIGS. 4 and 5. The plane (38) bounded on the outside by the edge (33) is intersected by the centerline (29), for example centrally and perpendicularly. The large flange upper side (37) forms, among other things, a mounting and support enveloping surface for the adhesive body (100) and/or the tooth crown (120).

Figure 7:
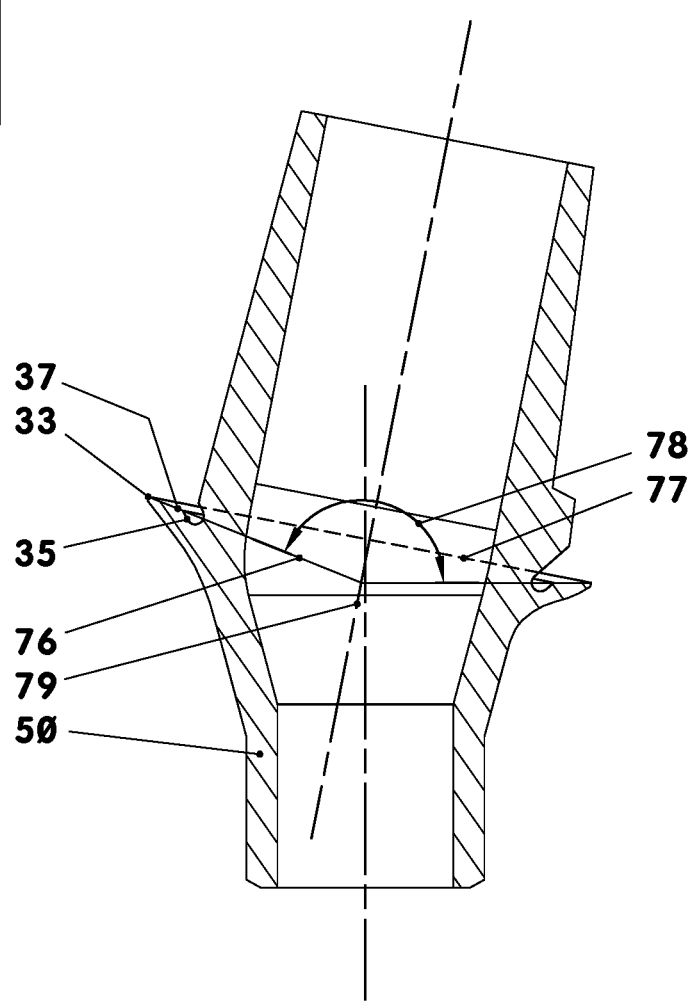
FIG. 7: Same as FIG. 5, but with the support enveloping surface curved downwards.

The rounded transition area (34) can also be deepened in an axial direction parallel to the centerline (29) by up to 0.2 mm, such that a circumferential channel (35), for example, is formed between the flat flange upper side (37) and the implant post (23), see FIG. 7.

In addition, the superstructure support (20) is equipped with a titanium nitride coating at least above the implant flange (31). Its layer thickness amounts to, for example, 1 to 4 μm. Alternatively, thin-walled ceramic or copolymer coatings can also be applied there.

According to FIG. 1, the superstructure support (20) has a continuous cavity (61), which has, in its central area, a kink point with an included angle of 73±13 angular degrees. The finished cavity (61) consists of three cavity zones. The lower cavity zone (62) belongs to the implant pin (50). It is, for example, a cylindrical hole with a length of, for example, 1.81 mm, the diameter of which, for example, amounts to 1.73 mm. The inner cone (65), which expands upwards, is connected to it. The inner cone, which is, for example, 1.08 mm high, has a taper angle of, for example, 30 angular degrees. It serves to support the head section of the screw (90) and lies below the reference plane (38). The hole (62) and the inner cone (65) have a common centerline (63), which is congruent, for example, with the centerline (59) oriented on the outer wall of the implant pin (50).

According to FIG. 3, the shaft (96) of the hexagon head screw (90) traverses this hole (62) when the prosthesis is mounted, whereas its shaft (96) does not contact the wall of the hole (62).

The upper cavity zone (67), which extends in the implant post (23), is a cylindrical hole whose diameter measures, for example, 2.42 mm with a length of 3.7 mm. It is used to insert the screw (90) and guide the tool used to tighten the screw (90). Its centerline (69) is, for example, aligned in a manner concentric with the centerline (29) of the implant post (23) oriented to the outer wall. The hole (67) ends, for example, approximately 0.33 mm in front of the reference plane (38) of the implant flange (31).

In the embodiment, both centerlines (63) and (69) intersect in the central cavity zone (64) at an intersection point (71) connecting the upper (67) and lower (62) cavity zones. The central cavity zone (64) is a curved recess in which the hole (67) and the inner cone (65) are connected to each other, for example in edge-free tangential transitions. Thereby, the interface (71) is located at a distance (72) below the reference plane (38). The distance here amounts to, for example, 0.22 mm. This enables a screw (90) to be seated deep in the superstructure support (20). The latter is thus located in the lower half of the superstructure support (20).

Figure 6:
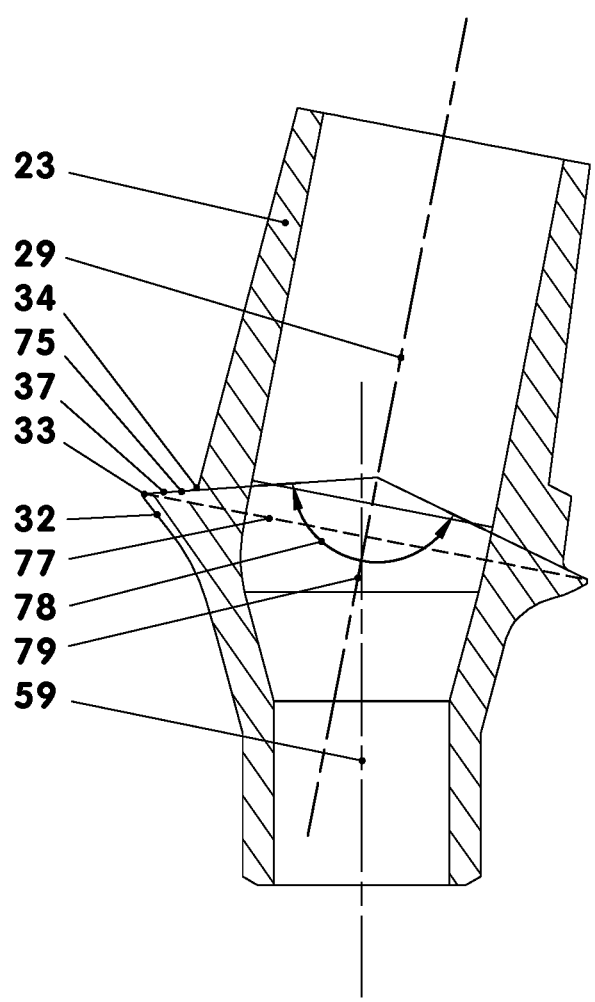
FIG. 6: Same as FIG. 5, but with the support enveloping surface curved upwards.

FIGS. 6 and 7 show two superstructure supports (20), the implant flange (31) of which has, instead of a flat flange upper side, a truncated cone shell-shaped support enveloping surface (75, 76) with the axis of rotation (79). According to FIG. 6, the truncated cone shell surface (75) is oriented so that its conceived tip lies in the area of the implant post (23). According to FIG. 6, the taper angle (78) amounts to, for example, 150 angular degrees. In such a case, the reference plane (38) of FIG. 5 is replaced by the large end surface (77) of the truncated cone shell (75). The end surface (77) spans from the edge (33) of the implant flange (31).

According to FIG. 7, the truncated cone shell-shaped support enveloping surface (76) of the implant flange (31) is curved downwards, by which the conceived tip of the truncated cone shell-shaped support enveloping surface points in the direction of the implant pin (59). Here as well, the large end surface (77) forms the reference plane (38) below which the intersection point (71) lies. According to FIG. 7, the taper angle (78) measures, for example, 158 angular degrees.

The superstructure support (20) is a slim, thin-walled component that has only slight wall thickness fluctuations over large areas. Individual above-average accumulations of material are structurally avoided. According to FIG. 5, the superstructure support (20) is intersected lengthwise in the plane that is spanned by the two centerlines (59) and (69). In the half-sided cross-sectional area, which is enclosed by the outer and cavity contour of the component, there is a measuring circle (9) at the point of the largest accumulation of material, which measuring circle lies at two points on the cross-sectional outer contour and at one point on the cross-sectional inner contour. This largest measuring circle (9) has a diameter smaller than 25 percent of the average diameter of the cavity (62).

In the embodiment, an adhesive body (100) is glued or cemented onto the superstructure support (20), see FIGS. 1 to 3. The adhesive body (100) is a hollow body arranged within the tooth replacement between the superstructure support (20) and the artificial tooth crown (120). It is used to, for example, adjust the angular position of the tooth crown (120) to the angular position of the implant post (23).

The adhesive body (100) essentially has a sleeve-shaped (for example, largely rotationally symmetrical) shape. Its inner wall (105) is adapted at least in some areas—in the radial direction—to the enveloping surface (28) of the implant post (23), whereas it is the interface geometry (146) of the negative interface part (145) of the interface (141, 145). An exception is the anti-twist device (41) arranged between the adhesive body (100) and the superstructure support (20).

The adhesive body (100) has a widened (for example, circumferential) edge area (107), with which, on the one hand, it is supported—in the axial direction—on the flange upper side (37) of the superstructure support (20) and with which, on the other hand, it provides an axial support, at least in some areas, for the crown (120) itself.

The assembly clearance in the assembly joint (140) between the supporting superstructure support (20) and the attachable adhesive body (100) amounts to, for example, 30 to 50 μm, such that the adhesive body (100) can be supported over a large area on the implant post (23) of the superstructure support (20) with the interposition of an adhesive (113).

In order to be able to sit on the superstructure support (20) in a rotationally fixed manner, the adhesive body (100) has a groove (108) in its, for example, conical recess (106), for example in the lower area, on the flanks of which the anti-twist bar (41) of the superstructure support (20) is supported. The groove (108) is not part of the interface geometry (146).

In the area of its upper side (102), the adhesive body (100) has a hole-like recess (106) that, when the prosthesis is mounted, represents an extension of the hole (67) of the implant post (23). After tightening the screw (90), the recess (106) can be filled with a filling material (8) if necessary.

There are several alternative interface geometries (142, 146) for the implant post (23) and the respective attachment means (5), which are shown individually in FIGS. 8 to 18.

Figure 8:
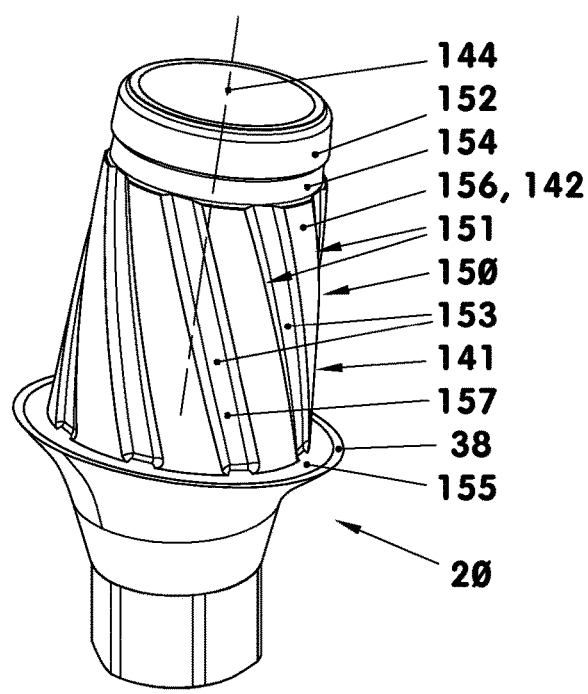
FIG. 8: Superstructure support shown in perspective with helical grooves.

FIG. 8 shows an implant post (150) of the superstructure support (20) with a truncated cone shell-shaped interface geometry (142). It is an enveloping surface (156) that is formed by the radial outer sides or head surfaces of the helically wound studs (151) and an upper circumferential cover ring bar (152). The studs (151) follow, for example, a helix that is wound to the left and that, together with the reference plane (38), includes a gradient angle of, for example, 70 angular degrees. Between the cover ring bar (152) and the upper ends of the studs (151) as shown in FIG. 8, there is a circumferential groove (154) in which the screw grooves (153) located between the studs (151) open.

Figure 19:
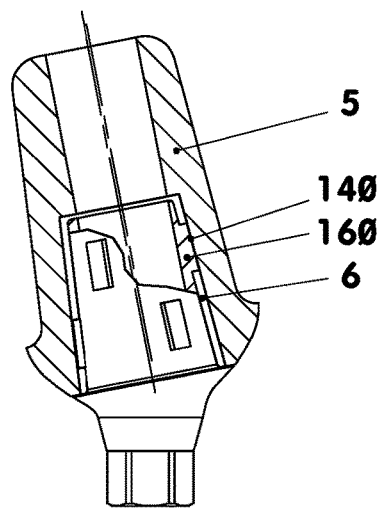
FIG. 19: Reduced longitudinal section through a superstructure support according to FIG. 9 with an adhesive body.

In the area of the implant flange, the studs (151) end in a circumferential adhesive channel (155). The latter reduces the regular support enveloping surface (37) known from FIG. 4, for example by more than 60 percent. The cross-sections of the grooves (153, 154) and of the channel (155)—they are oriented transversely to the longitudinal expansions of these depressions—are a function of the viscosity of the adhesive to be used with which the interface parts (141) and (145) are bonded together. Here, the circumferential groove (154), the screw grooves (153) and the adhesive channel (155) represent a common gap (6), see FIG. 19.

Figure 9:
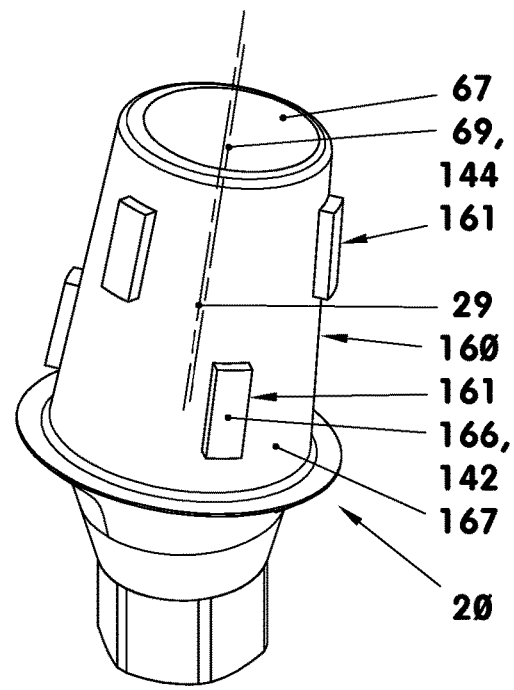
FIG. 9: Same as FIG. 8, but with staggered studs.
Figure 14:
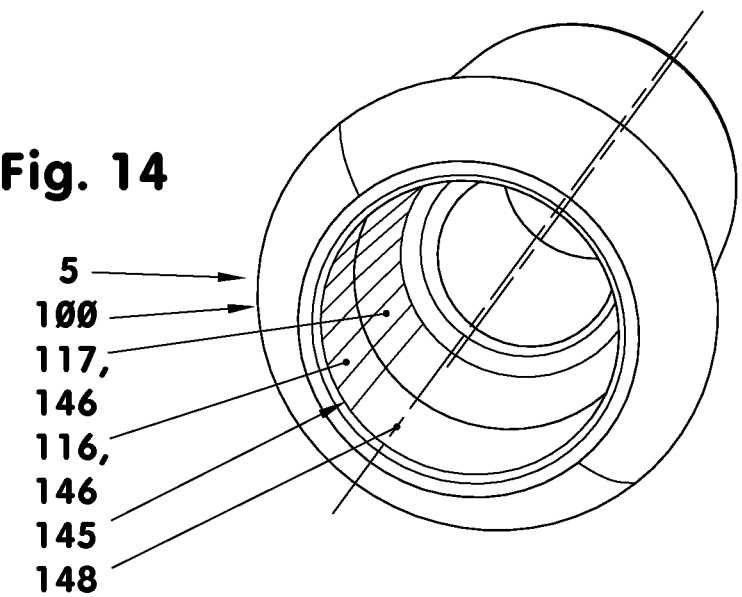
FIG. 14: Adhesive body shown in perspective for the superstructure support according to FIG. 13.
Figure 13:
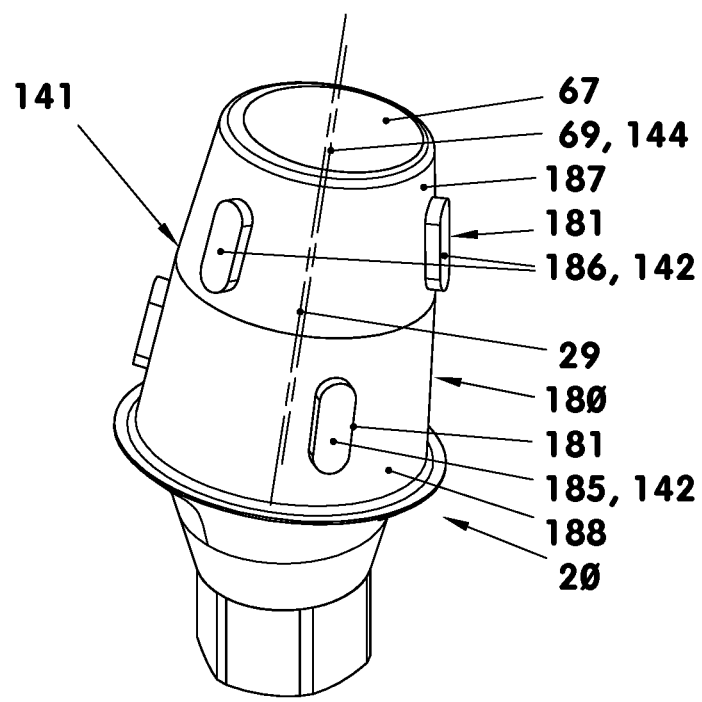
FIG. 13: Superstructure support shown in perspective with an enveloping surface consisting of two different truncated cone shells.

FIG. 9 shows an implant post (160) which, for example, carries six studs (161) on a truncated cone shell-shaped base surface (167). In each case, three studs (161) are arranged in such a manner that their centers of gravity lie on a plane that is normally intersected by the centerline (29). Each of the studs (161) is equidistantly distributed over the circumference. The studs (161) of the two planes are offset from each other by half a partition.

The individual stud (161) essentially has a cuboid shape. Its length corresponds to 2.6 times its width. For example, the height of the studs amounts to 0.2 mm, which is 0.4 times the width. The radial outer sides of the studs (161) lie in the truncated cone shell-shaped interface geometry (142) forming the enveloping surface (166).

In the present case, the centerline (29) is offset from the centerline (69) by, for example, 0.12 mm. The centerline (69) moves closer to the part of the central cavity zone (64), see FIG. 5, the height of which is shortest.

Figure 10:
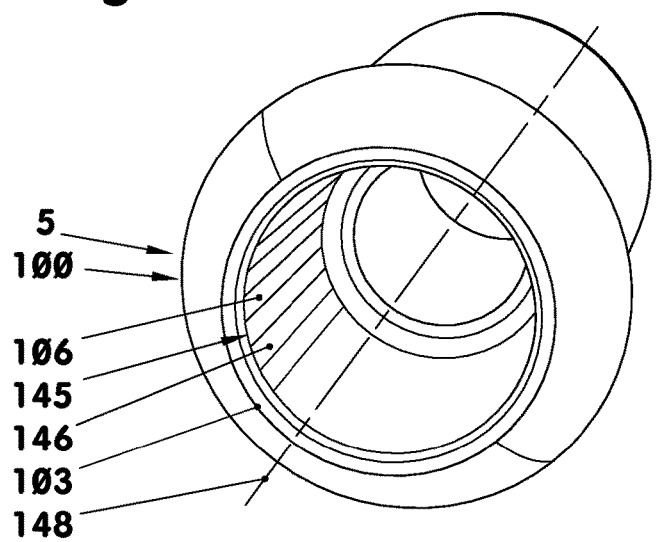
FIG. 10: Adhesive body shown in perspective for the superstructure support according to FIG. 8.

The adhesive body (100) shown in FIG. 10 fits the implant post (150) as the interface negative part (145). Its conical recess (106) forms the truncated cone shell-shaped interface geometry (146).

According to FIG. 11, the implant post (170) shown has an interface geometry (142) consisting of a lower cylindrical enveloping surface (175) and an upper conical enveloping surface (176). The latter has a cone angle of, for example, 18 angular degrees. The height of the upper longer enveloping surface (176) corresponds, for example, to 1.8 times the lower shorter enveloping surface (175). The outer sides of the angled, upwardly tapering studs (171) located in the enveloping surfaces (175, 176), the central axes of which lie in one plane with the centerline (69), are separated by wide grooves (172). Each of the grooves (172) has an inwardly curved groove base (173). The groove bases (173) are parts of a cylinder and/or a cone shell. The curvature of the groove base (173) in the lower area of the implant post (170) amounts to, for example, 55 percent of the maximum diameter of the implant flange (31). Thereby, the centerline of curvature is in the same plane as the centerline (69).

The corresponding adhesive body (100) has a two-part inner wall, see FIG. 12. The part of the inner wall that adjoins the lower end face (103) is a cylindrical partial inner wall (115). It is followed in the direction of the upper side (102) by a truncated cone shell-shaped partial inner wall (117).

The implant post (180) has a comparable interface geometry (142). However, here as well, the lower enveloping surface—predetermined by the lower studs (181)—is an enveloping cone (185), the cone angle of which amounts to, for example, 10 angular degrees. The upper envelope cone (186) has a cone angle that is, for example, at 16 angular degrees. The studs (181) have an arrangement on the implant post (180) that corresponds to that of the implant post (160). The size of the studs can also be found in the variant therein. Instead of the rectangular shape of the studs (161), the studs (181) have, for example, the shape of a key according to DIN 6885, Form A. However, the free outer side of the studs (181) is curved according to the enveloping surfaces (185, 186).

Here as well, the centerline (29) is offset by 0.12 mm from the centerline (69), see description of FIG. 9.

FIGS. 15 and 17 each show a superstructure support (20) the implant post (190) of which has a truncated cone shell-shaped base surface (197), which is occupied by a large number of cylindrical pins (191). The latter may also have another regular or irregular shape. Here as well, the free, curved end faces of the studs (191) also define a truncated cone shell-shaped enveloping surface (195). The pins (191) have a diameter of, for example, 0.5 to 1 mm. In the embodiment, they are arranged on a helix, for example, a right-hand helix, which decreases (for example, steadily decreases) its gap with increasing distance from the implant flange with respect to the centerline (69). Thereby, the helix has a gradient of 5 to 15 angular degrees. On the helix, the studs (191) are at a distance from one another which corresponds to, for example, one or two times their diameter.

In the vicinity of the implant flange, there is a pin (192) according to FIG. 15, which has, for example, 1-2.5 times the length of a pin (191). The pin (192) serves as an anti-twist element that engages in a corresponding groove (108) of the attachment element (5) after assembly, see FIG. 16.

Instead of this anti-twist element (191), which protrudes positively from the shape of the implant post (190), a groove (193), notch or the like worked into the implant post (190) can also be used for the production of an anti-twist element. A nose (109), a bar or another protruding structure of the attachment element (5) then reaches into this groove (193) after the attachment element (5) has been attached, see FIG. 18.

For all implant posts (23, 150, 160, 180, 190), the interface geometries (142) or their areas can be at a constant or variable distance from the respective opposite base surfaces or their areas.

Generally, each of the interface geometries (142) of the implant posts has centerlines (144) that are congruent with the corresponding centerlines of the base surfaces (157, 167, 187, 188, 197). However, deviations from this are conceivable. The same applies to the interface geometries (146) of the attachment elements (5) and their centerlines (148).

The hexagon head screw (90) is divided into three areas: a head area (91), a shaft area (96) and a thread area (97), see FIGS. 1 and 3. The first area is the head area (91). It comprises a conical head section (92) and a tool recipient (94) arranged thereon. The head section (92), which is, for example, 1.03 mm high, has the shape of a truncated cone tapering in the direction of the thread area (97), which has, for example, a cone angle of 30 angular degrees. The conical area with which the screw (90) lies against the superstructure support (20) has a maximum length of, for example, 0.83 mm. Its largest diameter here is 2.06 mm.

The head section (92) ends in an outwardly curved, conical head section end surface (93), the cone angle of which amounts to, for example, 160 angular degrees. An integrally formed tool recipient (94), which represents a spherical outer hexagon for a key length of 1.45 mm, sits on the head section end surface (93). The outer hexagon has six adjacent bearing flanks, each consisting of three surface sections. Each of the upper and lower surface sections (85, 86) extends over, for example, 0.4 mm of the tool recipient height. Both surface sections are flat and include, for example, an angle of 11.5 angular degrees with the screw centerline (89). The upper ends of the upper surface sections (85) incline toward the screw centerline (89) like the lower ends of the lower surface sections (86). Between each of the two planar surface sections (85, 86) arranged one above the other, a surface section (87) curved outwards in an arched manner is arranged. Its curvature oriented transversely to the screw centerline (89) has a radius of, for example, 0.9 mm.

To tighten the screw (90), a tube wrench with an inner hexagon socket can be attached to the tool recipient (94). Due to the special assembly of the upper and lower surface sections (85, 86), the tube wrench does not experience any reaction force along its longitudinal expansion during the transmission of torque. The front end face of the tube wrench rolls off on the truncated cone shell-shaped head section end surface (93) of the screw head (92) with low friction and no interference.

The conical area of the head section (92) is connected, for example tangentially connected, to the second area, i.e. the shaft area (96). The expansion screw-like shaft area (96) consists of a concave rotationally symmetrical midsection, which has its smallest diameter (for example, 1.3 mm) in the screw center area, for example, 3.5 mm from the free end of the head area (91). The average curvature of the outer contour of the midsection has a radius of, for example, 4.44 mm in the section according to FIG. 3.

The third area is the thread area (97). It has, for example, a rolled M1.6 thread, the usable length of which amounts to, for example, 2.6 mm.

According to the illustrated example, the tooth crown (120) sits on an adhesive body (100). Accordingly, the inner wall (125) of the tooth crown (120) is adapted to the outer wall (101) of the adhesive body (100). Here as well, the clearance between the outer wall (101) and the inner wall (125) is between 30 and 50 µm. The adhesive body (100) and the tooth crown (120) are designed in the area of the edge (132) of their adhesive joint (131) in such a manner that the last tenths of a millimeter meet the common prosthesis outer surface (2) at an angle of 90±10 angular degrees. In the area of the edge of its adhesive joint (131), the outer surface (121) of the tooth crown (120) and the outer surface (101) of the adhesive body (100) merge into one another tangentially or at least almost tangentially. If a kink is provided at that point, its included angle lies in an area that is smaller than 180 and larger than 175 angular degrees.

Thus, according to FIG. 3, with the finished prosthesis, the superstructure support 20 is seated in a rotationally fixed manner by means of an implant cone 53 and the anti-twist profile 54 and screwed in the conical seat 14 of the implant body 10 by means of the screw 90. Typically, the implant neck (52) and the lower side (32) of the implant flange (31) are in contact with the gum (not shown here). The combination of the adhesive body (100) and the artificial tooth crown (120) sits on the implant flange (31) by means of gluing.

Several text passages, according to which planes are intersected perpendicularly (for example, by centerlines), are mentioned in the printed text. In such cases, angular deviations of ±2 angular degrees are to still be considered as perpendicular.

LIST OF REFERENCE SIGNS

1 Tooth replacement, prosthetic
2 Prosthesis outside surface
5 Attachment element, measuring device, impression material, negative interface part
6 Gap, filling space, intermediate space
8 Cement, adhesive, filling material
9 Measuring circle
10 Implant body
11 External thread
12 Implant shoulder
13 Recess, stepped
14 Inner cone, first zone, cone, conical seat
15 Inner hexagon socket, second zone, counter profile
18 Threaded hole, third zone
18 Internal thread
19 Centerline of (10)
20 Superstructure support, part of a hybrid abutment
21 Area turned towards the tooth crown
23 Implant post, positive interface part
24 Upper side, bearing surface
26 Stud
27 Outer surface, radial
28 Enveloping surface
29 Centerline of (23)
31 Implant flange
32 Lower side, surface turned towards the gum
33 Edge
34 Transition area, bucket
35 channel
37 Flange upper side, support enveloping surface
38 Plane, reference plane
41 Anti-twist bar, anti-twist device
50 Implant pin
51 Area turned towards the implant body
52 Implant neck
53 Implant cone, outer cone
54 Anti-twist profile, outer hexagon
59 Centerline of (50)
61 Cavity, kinked; screw insertion recess
62 Lower cavity zone; hole, cylindrical
63 Centerline of (62)
64 Central cavity zone
65 Screw head seat space, inner cone, cavity zone
67 Upper cavity zone; hole, cylindrical 69 Centerline of (67)
71 Intersection point
72 Distance between (38) and (71)
73 Top edge of (65)
75 Truncated cone shell surface, support enveloping surface; curved upwards
76 Truncated cone shell surface, support enveloping surface; curved downwards
77 End surface, size of (75) or (76)
78 Taper angle of (75) or (76)
79 Centerline, axis of rotation of (75, 76)
85, 86 Surface sections of (94), flat
87 Surface sections of (94), curved
89 Screw centerline
90 Hexagon head screw, screw
91 Head area
92 Head section, conical; screw head
93 Head section end surface
94 Tool recipient; outer hexagon, spherical
96 Shaft area, midsection, shaft
97 Thread area, thread
100 Adhesive body, part of a hybrid abutment, negative interface part
101 Outer wall, outer surface
102 Upper side
103 End face, bottom
105 Inner wall, inner surface, total
106 Recess, truncated cone shell-shaped
107 Edge area
108 Groove, anti-twist groove
109 Anti-twist nose
111 Adhesive joint between (23) and (100)
113 Adhesive
115 Partial inner wall, cylindrical, implant-flange, near
116 Partial inner wall, truncated cone shell-shaped, implant flange, near
117 Partial inner wall, truncated cone shell-shaped implant flange, far
120 Tooth crown, artificial, superstructure, negative interface part (if applicable)
121 Outer wall, outer surface
125 Inner wall, inner surface
131 Adhesive joint between (100) and (120)
132 Adhesive joint edge
133 Adhesive
140 Mounting joint between (23) and (100)
141 Interface; positive part
142 Interface geometry of (141)
144 Centerline of (142)
145 Interface; negative part
146 Interface geometry of (145)
148 Centerline of (146)
150 Implant posts with screwed studs
151 Stud, helically wound
152 Cover ring bar
153 Screw grooves
154 Circumferential groove
155 Channel
156 Enveloping surface, cone-shaped
157 Base surface, cone-shaped
160 Implant posts with staggered studs
161 Studs, essentially cuboid in shape
166 Enveloping surface, cone-shaped
167 Base surface, cone-shaped
170 Implant posts with kinked studs
171 Studs, kinked off
172 Grooves
173 Groove base, curved inwards
175 Enveloping cylinder; enveloping surface, cylindrical
176 Enveloping cone; enveloping surface, truncated cone shell-shaped
180 Implant posts with staggered key studs
181 Studs, key-shaped
185 Envelope cone, bottom; enveloping surface, truncated cone shell-shaped
186 Enveloping cone, top; enveloping surface, truncated cone shell-shaped
187, 188 Base surfaces; bottom, top
190 Implant posts with staggered pins
191 Pins, cylindrical or truncated cone-shaped; studs
192 Anti-twist stud
193 Anti-twist grooves
195 Enveloping surface, truncated cone shell-shaped
197 Base surface

The invention claimed is:

1. A prosthetic tooth replacement system, comprising:
an implant body;
an attachment element; and
a superstructure support arranged between the implant body and the attachment element, the superstructure support comprising:
a hollow implant post;
a hollow implant pin; and
an implant flange arranged between the hollow implant post and the hollow implant pin,
wherein a cavity zone of the hollow implant post and a cavity zone of the hollow implant pin transition into each other,
wherein a centerline of the hollow implant post and a centerline of the implant pin intersect at an angle of 160 to 186 angular degrees,
wherein the attachment element is arranged on the implant post in a rotationally fixed manner by an assembly joint, which forms an interface with an assembly clearance,
wherein the attachment element is an artificial crown, a composite of an adhesive body and a crown, or another cap-type element,
wherein the attachment element has an inner enveloping surface, and
wherein the hollow implant post has a base surface and elevations in the form of studs, bars, cones, noses, or nubs protruding from the base surface, the elevations having a height of more than 0.05 mm,
wherein outer surfaces of the elevations define an outer enveloping surface of the hollow implant post, and
wherein the inner enveloping surface of the attachment element is arranged at an assembly clearance distance between 30 to 50 μm from the outer enveloping surface of the hollow implant post when the attachment element is seated on the implant flange.

2. The system according to claim 1,
wherein an upper side of the flange is arranged in a flange plane, and
wherein the inner enveloping surface of the attachment element and the outer enveloping surface of the hollow implant post each has a centerline which intersects the flange plane perpendicularly.

3. The system according to claim 1, wherein the inner enveloping surface of the attachment element and the outer enveloping surface of the hollow implant post are each composed of a cylinder shell or a truncated circular cone shell.

4. The system according to claim 3, wherein centerlines of the enveloping surface of the attachment element and the outer enveloping surface of the hollow implant post are congruent with one another.

5. The system according to claim 1, wherein an upper side of the flange comprises either a plane or a truncated cone shell surface.

6. The system according to claim 1, wherein an upper side of the flange comprises a truncated cone shell surface having a theoretical cone tip which faces the implant post or the implant pin.

7. The system according to claim 6, wherein a cone angle of the truncated cone shell surface is between 180 and 165 angular degrees.

8. The system according to claim 1, wherein the elevations are helically wounds studs.

9. The system according to claim 8, wherein the helically wound studs extend from an upper end arranged below a circumferential groove to a lower end at a circumferential adhesive channel.

10. The system according to claim 1, further comprising an anti-twist bar arranged near the implant flange.

11. The system according to claim 10, wherein the anti-twist bar is arranged on one of the elevations.

12. The system according to claim 10, wherein an outer edge of the implant flange has a circular shape.

13. The system according to claim 10, wherein the assembly clearance in the assembly joint is between 30 to 50 µm.

14. A prosthetic tooth replacement system, comprising:
an implant body;
an attachment element; and
a superstructure support arranged between the implant body and the attachment element, the superstructure support comprising:
a hollow implant post;
a hollow implant pin; and
an implant flange arranged between the hollow implant post and the hollow implant pin,
wherein a cavity zone of the hollow implant post and a cavity zone of the hollow implant pin transition into each other,
wherein a centerline of the hollow implant post and a centerline of the implant pin intersect at an angle of 160 to 186 angular degrees,
wherein the attachment element is arranged on the implant post in a rotationally fixed manner by an assembly joint, which forms an interface with an assembly clearance,
wherein the attachment element is an artificial crown, a composite of an adhesive body and a crown, or another cap-type element,
wherein the hollow implant post has an outer surface, and
wherein the attachment element has a base surface and elevations in the form of studs, bars, cones, noses, or nubs protruding from the base surface, the elevations having a height of more than 0.05 mm,
wherein inner surfaces of the elevations define an inner enveloping surface of the attachment element, and
wherein the outer surface of the hollow implant post is arranged at an assembly clearance distance between 30 to 50 µm from the inner enveloping surface of the attachment element when the attachment element is seated on the implant flange.

* * * * *